Jan. 25, 1966

R. D. GREER 3,231,809

MOTOR ACCELERATION CONTROL WITH
CONTROLLED RECTIFIER CIRCUIT

Filed Dec. 1, 1961

INVENTOR;
ROBERT D. GREER,
BY David Young
ATT'Y.

Jan. 25, 1966 R. D. GREER 3,231,809
MOTOR ACCELERATION CONTROL WITH
CONTROLLED RECTIFIER CIRCUIT
Filed Dec. 1, 1961 2 Sheets-Sheet 2

INVENTOR;
ROBERT D. GREER,
BY
David Young
ATT'Y.

United States Patent Office 3,231,809
Patented Jan. 25, 1966

3,231,809
MOTOR ACCELERATION CONTROL WITH
CONTROLLED RECTIFIER CIRCUIT
Robert D. Greer, Upper Arlington, Ohio, assignor to
Jeffrey Galion Manufacturing Company, a corporation
of Ohio
Filed Dec. 1, 1961, Ser. No. 156,340
1 Claim. (Cl. 318—400)

The instant invention relates to motor control circuits, and more particularly to an improved time delay device for motor control.

It is an object of the instant invention to provide an improved solid state time delay device for motor control.

It is a further object of the instant invention to provide an improved time delay device for motor control, which may be encapsulated in a relatively small package for protection of the device.

It is another object of the instant invention to provide an improved time delay device for motor control, which has no moving parts and thus is not susceptible to wear or other damage, whereby the operating characteristics of the time delay device will remain fixed and highly reliable over the entire life of the device.

It is still another object of the instant invention to provide an improved time delay device for motor control utilizing semi-conductor elements, which permits reduction of the size of the device to a small, compact package.

It is also an object of the instant invention to provide an improved time delay device utilizing semi-conductor elements having an extremely long operating life and great reliability of operation, which features inure to the device as a whole.

Other objects of the invention will appear hereinafter, the novel features and combinations being set forth in the appended claim.

Figure 1:
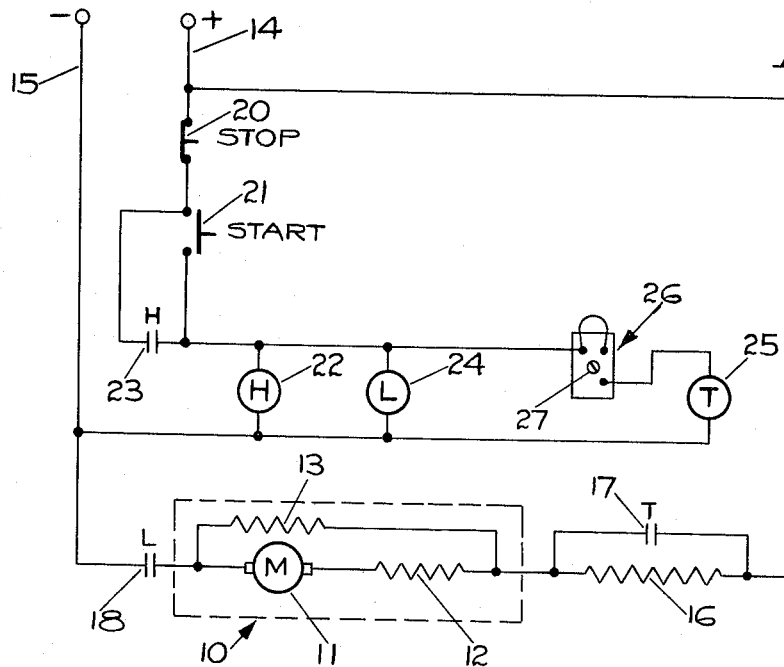
FIG. 1 is a circuit diagram of a motor control circuit, incorporating the time delay device of the instant invention.

Referring to FIG. 1, there is illustrated a motor 10 having an armature 11, a series field 12, and a shunt field 13. The motor 10 is connected across the line which supplies the power for operation of the motor 10, by connection thereof to the positive line 14 and the negative line 15 of a direct current power source. A starting resistance 16 is connected in series with the motor 10, and after the latter has reached a predetermined operating speed the starting resistance 16 is effectively disconnected from the motor 10 by the closing of the contactor 17 of a relay, the operation of which is timed to delay the closing of the contactor 17 for the desired time interval. The time delay interval is predetermined to disconnect the resistance 16 from the motor 10 after the latter has attained the desired operating speed. The contactor 17 forms a shunt connection across the resistance 16, resulting in the effective disconnection of the resistance 16 from the motor 10. A contactor 18 is connected in series with the motor 10 and is operated by a line relay to connect the motor 10 across the positive and negative lines 14, 15.

The positive line 14 includes a normally closed stop switch 20 and a normally open start switch 21. The operation of the motor 10 is started by momentarily closing the start switch 21. Current is conducted to the coil 22 of a hold relay, thereby energizing the coil 22 to close the contactor 23 of the hold relay. When start switch 21 is released, it is self-restoring to the open position, and thereafter current is conducted through the closed hold contactor 23 to the coil 22 of the hold relay, to maintain the latter energized, which, of course, maintains the hold contactor 23 closed. To stop operation of the motor 10, the stop switch 20 is momentarily opened, which interrupts the flow of current to the hold coil 22, deenergizing the latter, which causes the hold contactor 23 to open, thereby breaking the circuit. The stop switch 20 is self-restoring to the closed position, but since the hold contactor 23 has been opened the circuit remains broken.

The coil 24 of a line relay is connected across the positive and negative lines 14, 15 and is energized when the circuit is closed as above described. The coil 24 operates the line contactor 18 to close the latter, thereby connecting the motor 10 to the power source, which starts the motor 10 in operation.

The coil 25 of a time controlled relay is also connected across the positive and negative lines 14, 15 and is energized to close the timed contactor 17. The time delay device 26 of the instant invention is connected in series with the time controlled coil 25 to delay energization thereof for a predetermined time interval, to permit the motor 10 to reach the desired operating speed before the contactor 17 is closed to effectively disconnect the starting resistance 16 from the motor 10.

Figure 2:
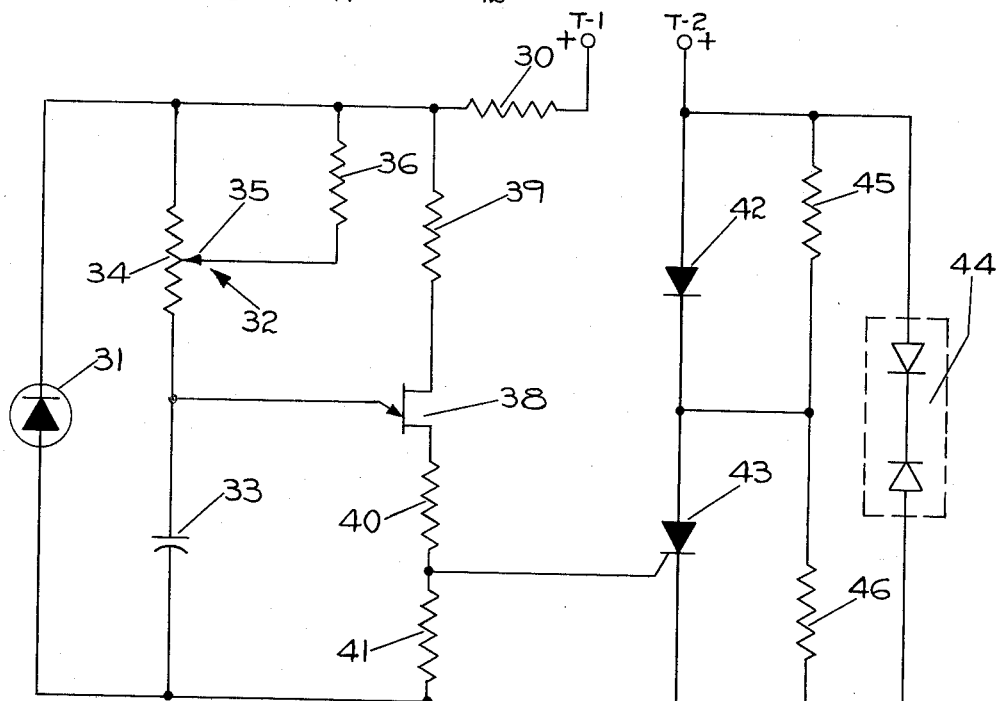
FIG. 2 is a circuit diagram of the time delay device of the instant invention.

Referring to FIG. 2, there is illustrated therein the circuit of the time delay device 26, which is provided with three terminals, designated T–1, T–2 and T–3. Terminals T–1 and T–2 are connected to the positive line 14, and terminal T–3 is connected to the negative line 15 through the time controlled coil 25. In the application of the timing device 26 to the circuit illustrated in FIG. 1, terminals T–1 and T–2 are connected to each other. However, in other applications of the time delay device 26 there may be provided independent line connections to the terminals T–1 and T–2.

A resistance 30 is connected to the terminal T–1, and a Zener diode 31 is connected in series with the resistance 30. The potential across the Zener diode 31 is substantially constant for varying amounts of current conducted by the Zener diode 31. Within the limits of operation of the time delay device 26, the Zener diode 31 operates to provide a regulated control potential for the time delay device 26. The Zener diode operates to provide the regulated control potential notwithstanding variations in the line potential. A potentiometer 32 is connected in series with a capacitor 33, and these elements are connected across the Zener diode 31 so that the regulated control potential is applied to the potentiometer 32 and the capacitor 33. The potentiometer 32 comprises a resistance 34 and a sliding arm contact 35, by which the effective value of the resistance 34, in series with the capacitor 33, is varied. A resistance 36 is connected to the sliding arm contact 35, and in any position of the sliding arm contact 35 the resistance 36 is always connected in series with the capacitor 33, to thereby establish the lower limit of time for charging the capacitor 33. The resistance 34 is extremely large, compared to the value of the resistance 36, whereby the effective current path for charging the capacitor 33 will be through the resistance 36 and through that portion of the resistance 34 which is connected in series with the resistance 36 by the sliding arm contact 35. By means of the potentiometer 32 the time for charging the capacitor 33 may be adjusted to any desired value within a given range, as determined by the values of the resistances 34, 36, and the capacitor 33. In the preferred embodiment of the time delay device 26, it is provided with an externally accessible adjusting element 27 for adjustment of the potentiometer 32.

A unijunction transistor 38 is connected across the Zener diode 31 for application of the regulated control potential to the unijunction transistor 38. A resistance 39 is connected in series with the unijunction transistor 38 for temperature stabilization of the latter. The emitter of the unijunction transistor 38 is connected to the junction of the potentiometer 32 and the capacitor 33. When the capacitor 33 is charged to the triggering potential of the unijunction transistor 38, the latter is trigerred by this potential to the conductive state, and the capacior 33 discharges through the unijunction transistor 38 and resistances 40, 41. The resistances 40, 41 are connected in series to each other and to the unijunction transistor 38, and the sum of the values of the resistances 40, 41 together with the value of the capacitor 33 determines the time interval during which the capacitor 33 discharges and maintains the unijunction transistor 38 in the conductive state, for flow of current through the resistances 40, 41.

A diode 42 is connected in the forward biased direction to the terminal T-2, and a silicon controlled rectifier 43 is connected in series with the diode 42. The silicon controlled rectifier 43 is normally non-conductive in the forward biased direction and thereby blocks the flow of current from terminal T-2 to terminal T-3, whereby the time controlled coil 25 is not energized. While the silicon controlled rectifier 43 is in the non-conductive state there will be a flow of current from terminal T-1 to terminal T-3 and thence to the time controlled coil 25. However, the current flow from terminal T-1 to terminal T-3 is of a very small magnitude, and there is insufficient current flowing through this path to the time controlled coil 25 for energization of the latter. Thus the time controlled coil 25 will not be energized for operation of the contactor 17 until the silicon controlled rectifier 43 is triggered to the conductive state.

The unijunction transistor 38 is connected to the gate of the silicon controlled rectifier 43. When the unijunction transistor 38 is triggered to the conductive state, the flow of current through the resistance 41 establishes a potential across the resistance 41, which in turn establishes a gate-cathode potential for the silicon controlled rectifier 43 to trigger the latter to the conductive state, whereupon current will flow from terminal T-2 to terminal T-3, and thence to the time controlled coil 25 for energization of the latter.

The silicon controlled rectifier 43 is maintained in its conductive state by the conduction of a current of a magnitude at least equal to the holding current of the silicon controlled rectifier 43. Thus, it is required that the gate-cathode potential for triggering the silicon controlled rectifier 43 be maintained for a time interval at least equal to the time interval during which the current conducted by the silicon controlled rectifier 43 increases to the magnitude of the holding current therefor. Of course, the time controlled coil 25 is an inductive load, so that the rate of increase of the current conducted through the silicon controlled rectifier 43 will be determined by inductance-resistance characteristics of the time controlled coil 25. Accordingly, the triggering gate-cathode potential for the silicon controlled rectifier 43 must be maintained for a sufficient time interval commensurate with the time interval during which the current conducted by the silicon controlled rectifier 43 increases to the magnitude of the holding current. The values of the resistances 40, 41 are selected accordingly, to so establish the time of discharge of the capacitotr 33 to provide the triggering gate-cathode potential during a sufficient time interval to permit the current conducted through the silicon controlled rectifier 43 to reach the magnitude of the holding current, and thereafter the silicon controlled rectifier 43 will be maintained in the conductive state by the current conducted through the same.

Referring to FIG. 1, it is seen that hold coil 22 and the line coil 24 are connected in parallel with the terminals T-2 and T-3 of the time delay device 26 and the time controlled coil 25. When the coils 22, 24 are deenergized by opening of the stop switch 20, there will be induced in the coils 22, 24 a reverse potential that may substantially exceed the value of the forward potential at which the coils 22, 24 normally operate. The induced reverse potential is applied across the terminals T-2 and T-3 of the time delay device 26 and the time controlled coil 25. Since the induced reverse potential may exceed the inverse potential may exceed the inverse potential limit of the silicon controlled rectifier 43, it is necessary to provide protection in the circuit for this element against an excessive inverse potential.

A voltage suppression element 44, comprising back to back voltage limiting selenium diodes, is connected across the diode 42 and the silicon controlled rectifier 43. The voltage suppression element 44 limits the maximum value of the reverse potential which is applied to the diode 42 and the silicon controlled rectifier 43. A resistance 45 is connected across the diode 42, and a resistance 46 is connected across the silicon controlled rectifier 43. The resistances 45, 46 are connected in series and divide the reverse potential, as limited by the voltage suppression element 44, between the diode 42 and the silicon controlled rectifier 43, respectively. The values of the resistances 45, 46 are selected to divide the reverse potential between the diode 42 and the silicon controlled rectifier 43, in accordance with the specified ratings of these elements, so that the reverse potential which is applied to the diode 42 and the silicon controlled rectifier 43 is within the specified ratings thereof.

The voltage suppression element 44 is non-conductive with respect to the potential normally applied across the terminals T-2 and T-3 in the forward direction. The resistances 45, 46 are of sufficiently high values that they conduct a negligible amount of current to the time controlled coil 25 at the potential normally applied to the terminals T-2 and T-3 and the time controlled coil 25 in the forward direction. Thus, the energization of the coil 25 is under the sole control of the silicon controlled rectifier 43, as above described.

The reverse potential which is induced upon deenergization of the hold coil 22 and the line coil 24 is also applied across the terminals T-1 and T-3 and the time controlled coil 25. A conductive path is provided between the terminals T-1 and T-3 through the Zener diode 31, which is forward biased with respect to the reverse potential, and through the resistance 30.

Figure 3:
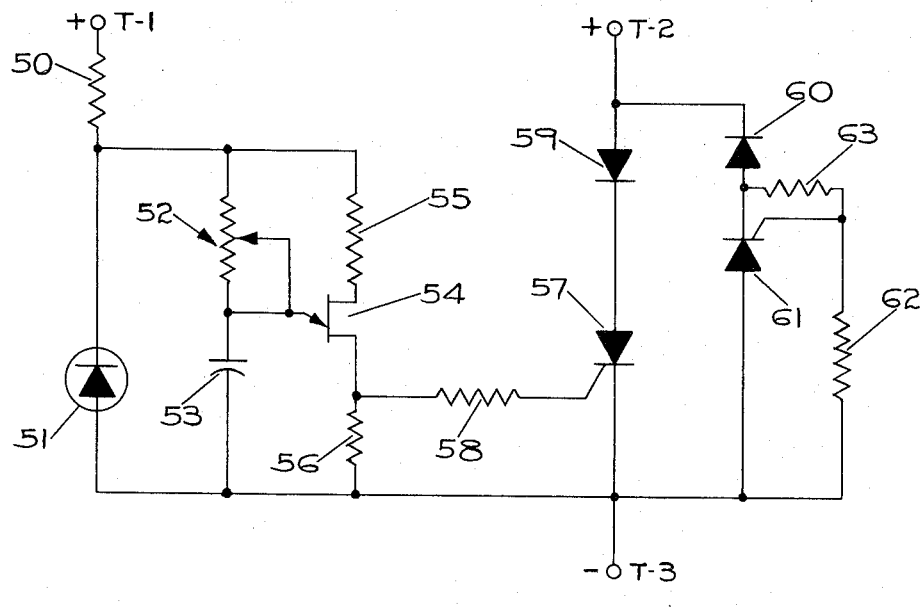
FIG. 3 is a circuit diagram of the time delay device of the instant invention, including certain modifications in the circuit.

Referring to FIG. 3, there is illustrated therein a modified form of the circuit for the time delay device 26. In this circuit the resistance 50 is connected to terminal T-1, and the Zener diode 51 is connected in series with the resistance 50. The resistance 50 and the Zener diode 51 are connected between terminals T-1 and T-3. The Zener diode 51 provides a regulated control potential for the control circuit.

A potentiometer 52 and a capacitor 53 are connected to each other in series, and both are connected across the Zener diode 51. The regulated control potential is applied across the potentiometer 52 and the capacitor 53 to charge the latter in a given time delay interval as determined by the setting of the potentiometer 52. A unijunction transistor 54 is connected across the Zener diode 51, with a resistance 55 connected in series with the unijunction transistor 54 for temperature stabilization thereof.

When the capacitor 53 is charged to the value of the triggering potential of the unijunction transistor 54, the latter is triggered by application of the triggering potential to the emitter of the unijunction transistor 54, thereby rendering the latter conductive. The time interval for discharge of the capacitor 53 is determined by the value of the resistance 56, which is connected in series with the unijunction transistor 54. The unijunction transistor is connected to the gate of the silicon controlled rectifier 57, and the potential across the resistance 56 establishes a gate-cathode potential for the silicon controlled rectifier 57 to trigger the latter to a conductive state. The resistance 58 which is connected to the gate of the silicon controlled rectifier 57 limits the current in accordance with the specified characteristics of the silicon controlled rectifier 57.

The diode 59 is connected in series with the silicon controlled rectifier 57 and is forward biased, so that a conductive path is provided between the terminals T–2 and T–3 through the diode 59 and the silicon controlled rectifier 57 for energization of the time controlled coil 25. The gate-cathode triggering potential is applied to the silicon controlled rectifier 57 during a sufficient time interval to permit the current through the silicon controlled rectifier 57 to increase to the value of the holding current of the silicon controlled rectifier 57, following which the silicon controlled rectifier 57 is maintained in the conductive state by continuous conduction of a current of a magnitude which is at least equal to the value of the holding current.

The reverse potential, which is induced in the coils 22, 24 upon deenergization thereof, may exceed the inverse potential limit of the silicon controlled rectifier 57, and in order to protect the silicon controlled rectifier 57 from an excessive inverse potential, there is provided a diode 60 and a silicon controlled rectifier 61 which are connected to each other in series, and which are connected across the diode 59 and the silicon controlled rectifier 57. A resistance 62 and a resistance 63 are connected to each other in series. The resistance 62 is connected between the anode and gate of the silicon controlled rectifier 61, and the resistance 63 is connected between the gate and cathode of the silicon controlled rectifier 61.

Upon application of the induced reverse potential across terminals T–2 and T–3 and the time controlled coil 25, the resistances 62, 63 serve to divided the potential. The potential across the resistance 63 establishes a gate-cathode potential of sufficient magnitude to trigger the silicon controlled rectifier 61 to the conductive state when the reverse potential attains a predetermined magnitude, whereupon there is provided a path for the current produced by the reverse potential through the silicon controlled rectifier 61 and the diode 60. There is thus provided a low resistance conductive path for the current produced by the reverse potential, which by-passes the silicon controlled rectifier 57. The diode 59 and the silicon controlled rectifier 57 are reverse biased by the reverse potential and offer a very high resistance to the flow of any current. Accordingly, only an insignificant amount of leakage current will flow through the diode 59 and the silicon controlled rectifier 57, due to the reverse potential across the terminals T–2 and T–3. The reverse potential which is applied across the terminals T–2 and T–3 is divided between the silicon controlled rectifier 57 and the diode 59, in accordance with the resistances thereof, and thus the potential across each of these elements is maintained within the specified inverse ratings thereof.

When the forward potential is applied to the terminals T–2 and T–3, the diode 60 is reverse biased and blocking, so that there is no flow of current through the resistances 62, 63. Accordingly, energization of the time controlled coil 25 is solely under control of the silicon controlled rectifier 57.

Figure 4:
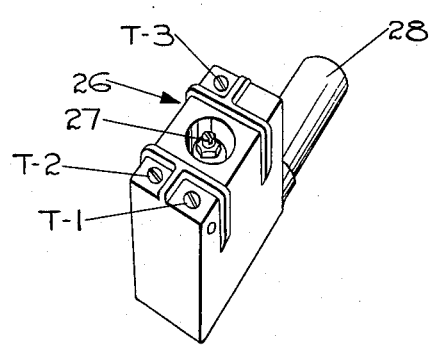
FIG. 4 illustrates the encapsulated time delay device.

In FIG. 4 there is illustrated the timing device 26 as it may be encapsulated by the use of a suitable plastic composition. In this embodiment the package is provided with a projecting stem 28 adapted to be inserted in a socket for mounting the timing device 26. The very small size of the several elements of the timing device 26 permits the encapsulated package to be made accordingly small, and by encapsulation the several elements of the device are permanently protected.

Obviously those skilled in the art may make various changes in the details and arrangement of parts without departing from the spirit and scope of the invention as defined by the claim hereto appended, and applicant therefore wishes not to be restricted to the precise construction herein disclosed.

Having thus described and shown an embodiment of the invention, what it is desired to secure by Letters Patent of the United States is:

In a motor circuit having a resistance connected to a motor for starting the motor in operation and inductive relay means for effectively disconnecting the resistance from the motor after the motor is started, a control circuit for time delayed operation of said inductive relay disconnecting means comprising, a first terminal, a second terminal and a third terminal, a resistance and a Zener diode connected in series between said first terminal and said third terminal of the control circuit and providing a substantially constant control potential across the Zener diode, time responsive potential means connected across said Zener diode to provide a given potential after a given time delay interval, a unijunction transistor connected across said Zener diode and connected to said potential means for triggering the unijunction transistor by said given potential, a silicon controlled rectifier connected between said second terminal and said third terminal of the control circuit, said inductive relay disconnecting means being connected to said third terminal, said silicon controlled rectifier being adapted to conduct current between said second terminal and said third terminal to said inductive relay disconnecting means, said silicon controlled rectifier being normally non-conductive and being adapted to be maintained in a conductive state by a given level of current conducted by the silicon controlled rectifier, and said unijunction transistor being connected to the gate of said silicon controlled rectifier to trigger the silicon controlled rectifier for conducting current to said inductive relay disconnecting means during a time interval at least equal to the time interval during which the current conducted to the inductive disconnecting means increases to the level required to thereafter maintain the silicon controlled rectifier in a conductive state.

References Cited by the Examiner
UNITED STATES PATENTS

| 2,602,888 | 7/1952 | Audier | 318—400 |
| 3,138,722 | 6/1964 | Morgan | 307—88.5 |

OTHER REFERENCES

Publication: GESCR Manual, 1960, Tk 2798, G4g., pages 94, 96.

Publication: GE Transistor Manual, 5th Edition 1960 Tk 7872, T73 G4, pages 143, 144.

ORIS L. RADER, *Primary Examiner.*

MILTON O. HIRSHFIELD, *Examiner.*